US008836470B2

(12) United States Patent
Pineau et al.

(10) Patent No.: US 8,836,470 B2
(45) Date of Patent: Sep. 16, 2014

(54) SYSTEM AND METHOD FOR INTERFACING FACILITY ACCESS WITH CONTROL

(75) Inventors: Stephen Pineau, Richmond (CA); Garry Anderson, North Vancouver (CA)

(73) Assignee: Viscount Security Systems Inc., Burnaby (CA)

( * ) Notice: Subject to any disclaimer, the term of this patent is extended or adjusted under 35 U.S.C. 154(b) by 716 days.

(21) Appl. No.: 12/958,780

(22) Filed: Dec. 2, 2010

(65) Prior Publication Data

US 2012/0139694 A1 Jun. 7, 2012

(51) Int. Cl.
*G05B 19/00* (2006.01)
*G07C 9/00* (2006.01)
*H04L 29/06* (2006.01)

(52) U.S. Cl.
CPC ........ *G07C 9/00166* (2013.01); *G07C 9/00103* (2013.01); *H04L 29/06068* (2013.01)
USPC ............................. 340/5.2; 340/506; 370/466

(58) Field of Classification Search
CPC ....................................................... G08B 25/14
USPC ................ 340/5.2, 5.8, 5.82, 5.85, 5.74, 512; 235/384
See application file for complete search history.

(56) References Cited

U.S. PATENT DOCUMENTS

| | | | | |
|---|---|---|---|---|
| 5,936,544 | A | 8/1999 | Gonzales et al. | |
| 6,965,294 | B1 | 11/2005 | Elliott et al. | |
| 6,988,203 | B2 | 1/2006 | Davis et al. | |
| 7,118,033 | B2 | 10/2006 | Merkert, Sr. | |
| 7,124,101 | B1 | 10/2006 | Mikurak | |
| 7,293,698 | B2 | 11/2007 | Cheng et al. | |
| 7,380,120 | B1 | 5/2008 | Garcia | |
| 7,437,755 | B2 | 10/2008 | Farino et al. | |
| 7,467,400 | B1 | 12/2008 | Moss et al. | |
| 7,583,188 | B2 | 9/2009 | Sawhney | |
| 7,734,572 | B2 | 6/2010 | Wiemeyer et al. | |
| 2002/0152298 | A1 | 10/2002 | Kikta et al. | |
| 2005/0144463 | A1 | 6/2005 | Rossebo et al. | |
| 2005/0190774 | A1 | 9/2005 | Wiegand | |
| 2006/0023742 | A1 * | 2/2006 | Cheng et al. | 370/466 |
| 2006/0288101 | A1 | 12/2006 | Mastrodonato et al. | |
| 2007/0094716 | A1 * | 4/2007 | Farino et al. | 726/5 |
| 2008/0129444 | A1 | 6/2008 | Nassimi | |

(Continued)

FOREIGN PATENT DOCUMENTS

| | | |
|---|---|---|
| WO | 2007022107 | 2/2007 |

OTHER PUBLICATIONS

Ib technology Micro RWD H1 Chip Data sheet, revised Jan. 30, 2002.*

(Continued)

*Primary Examiner* — Daniel Wu
*Assistant Examiner* — Frederick Ott
(74) *Attorney, Agent, or Firm* — John R Flanagan

(57) ABSTRACT

A system for interfacing facility access with control employs an electronic bridge that transparently conveys data between functional devices, such as remotely located card readers and door strikes, and a network incorporating a control and monitor computer that has access to a database of user identifications and permissions. The electronic bridge is flexibly configured to accept a wide range of protocols used by the devices and converts messages to data packets without prior knowledge of the length of the message.

23 Claims, 5 Drawing Sheets

(56) References Cited

U.S. PATENT DOCUMENTS

| | | | | |
|---|---|---|---|---|
| 2008/0218330 | A1 * | 9/2008 | Biles et al. | 340/506 |
| 2008/0229400 | A1 | 9/2008 | Burke | |
| 2008/0265023 | A1 | 10/2008 | Nassimi | |
| 2010/0034375 | A1 | 2/2010 | Davis et al. | |
| 2010/0235487 | A1 | 9/2010 | Guthery et al. | |

OTHER PUBLICATIONS

ET Concept Systems Engineering Wiegand to RS485 Converter W2RS485 User's Guide, V1.1, Nov. 30, 2008.*

Rigney et al., IETF RFC 2865, Remote Authentication Dial in User Service (RADIUS), Jun. 2000.*

HID Global Corporation. "Edge Pulse E400," retrieved from http://www.hidglobal.com/documents/edgepluse400__ds__en.pdf on May 6, 2010.

ISONAS Security Systems. "Presenting the ISONAS PowerNet IP Reader-Controller," retrieved from http://isonasacs.isonas.com:8098/PDF/IsonasProductsheetPoEreader.pdf on Aug. 2, 2010.

GIGA-TMS INC. "WEC200: TM Ethernet Access Controller," retrieved from http://www.gigatms.com.tw/upload/product/catalog/catalog__134.pdf on Aug. 2, 2010.

GIGA-TMS INC. "WEC200: Wiegand to Ethernet Converter/Controller," retrieved from http://www.gigatms.com.tw/upload/product/catalog/catalog__112.pdf on Aug. 2, 2010.

Solus Security Systems Pvt. Ltd.. "ID08," retrieved from www.solus.co.in/documents/brochures/doc__download/8-id-08 on Aug. 2, 2010.

Suprema Inc.. "Suprema BioEntry Plus," retrieved from http://www.supremainc.com/eng/bbs/bbs/download.php?bbs__code=10022&bbs__cate=1&filename=BioEntry__Plus.pdf&file__no=109 on Aug. 2, 2010.

* cited by examiner

SYSTEM AND METHOD FOR INTERFACING FACILITY ACCESS WITH CONTROL

TECHNICAL FIELD

The present invention generally relates to controlling facility access and, more particularly, is concerned with a system and method for interfacing facility access, via functional devices such as door access readers and door entry control relays, with control, via a network that uses the internet protocol suite.

BACKGROUND

In many businesses, organizations or public areas, security systems are employed to control access to the physical facilities or resources, and to safeguard authorized and unauthorized visitors. Security risks may be managed by controlling access by specified individuals based upon a specific set of criteria, such as time of day or day of the week.

In a typical physical-access controlled environment, a physical security system may include one or more functional devices, such as: entry lock mechanisms; entry open/close sensors; video surveillance cameras; microphones; credentials, such as some form of electronic or physical identification of a device or individual; credential identification input devices, such as a badge reader, PIN number keypad or biometric detector; communication and connectivity devices, such as door control panels; credential verification devices; policy-based access control devices, such as access control panels; credential and policy creation servers; a monitoring, event logging, and alarm reporting server; and a permission database defining which users have access to which facility, and when.

The control panel is typically located in close proximity to an entrance. Many control panels used in a typical physical-access controlled environment have a full or partial credential list. As facilities have multiple entrance points, each often with a corresponding control panel, it requires considerable work to ensure that all control panels are up to date. There are some access control systems that offer centralization of the data that would otherwise be distributed in multiple control panels. In these systems, the control panels pass credential information on to a central device such as a server for credential verification and policy enforcement. The server, if granting access, will then send an 'access granted' signal to the appropriate control panel, which would then forward a signal to a relay for controlling the opening of a door.

It is common for access control devices, such as badge or card readers, electro-mechanical locks, and door sensors, to be connected by a serial Wiegand or RS485 connection to a door control panel. The functional devices typically communicate via a simple signaling protocol, which in many cases is specific to a single vendor.

SUMMARY OF INVENTION

The present invention is directed to a system and method for interfacing facility access with control, particularly for facilities or physical premises, such as buildings, homes, physical infrastructure and restricted areas within buildings. In particular, it relates to use of an electronic bridge (hereinafter for sake of brevity referred to as a "bridge") to interface functional devices such as door access readers and door entry control relays with a network that uses the internet protocol suite, without the need for a control panel. The functional devices may be legacy security devices or they may be current or future devices. The functional devices need not all follow the same protocol, or the same version of a protocol, as the flexibility to accept different protocols is built into the bridge. As a result, building managers are not tied to a single vendor for supplying access security devices. Instead of requiring field upgrades and replacement of remote reader-supporting hardware, as is done now, once the bridge is installed and wired remotely, there are no changes to be made in the installed plant. All database and card access information is contained in a network-based control unit, such as a control and monitoring computer (CMC), so that future requirements are easily accommodated. Transparency of the bridge provides for future applications, and changes, to be made in the CMC thereby not requiring any upgrades to, or replacement of, the remote hardware of the bridge, wherever it may be installed.

In one aspect, the present invention is directed to a system for interfacing facility access with control. The system includes a plurality of functional devices adapted to receive control instructions and generate trains of digital pulses wherein the trains of digital pulses relate to various facility access functionalities of the devices and at least some of the trains of pulses have different format protocols in terms of one or more of number of pulses, pulse width, and time period between pulses. The system also includes a network including at least one control unit adapted to generate the control instructions, and at least one electronic bridge interfacing the devices and the network. The bridge has input/output circuits adapted to receive the control instructions, pass the control instructions to the devices, and detect the trains of digital pulses from the devices. The bridge also has a central processing unit (CPU) configured to receive the trains of digital pulses from the input/output circuits, process or start to process the trains of digital pulses into strings of data signals without first determining the different format protocols of the trains of digital pulses, build packets including the strings of data signals, and send the packets to the control unit via the network.

In another aspect, the present invention is directed to a method for interfacing facility access with control. The method also includes: generating trains of digital pulses by various facility access functionalities wherein at least some of the trains of pulses have different format protocols in terms of number of pulses, pulse width, and/or time period between pulses; receiving control instructions from a control unit via a network; passing the control instructions to the various facility access functionalities to control the same; detecting the trains of digital pulses; processing or starting to process the trains of digital pulses into strings of data signals without first determining the different format protocols of the trains of digital pulses; building packets that include the strings of data signals; and sending the packets to the control unit via the network.

In a further aspect, the present invention is directed to an electronic bridge for interfacing facility access with control. The bridge includes input/output circuits adapted to output control instructions to various functional devices relating to various facility access functionalities and detect trains of digital pulses from the various functional devices. The bridge also includes a central processing unit (CPU) configured to receive control instructions from a control unit via a network, pass the control instructions to the input/output circuits for output to the functional devices, receive the trains of digital pulses from the input/output circuits wherein at least some of the trains of pulses have different format protocols in terms of number of pulses, pulse width, and/or time period between pulses, process or start to process the trains of digital pulses into strings of data signals without first determining said different format protocols of the trains of digital pulses, build packets including the strings of data signals, and send the packets to the control unit via the network.

In yet a further aspect, the present invention is directed to a control unit for controlling facility access, the control unit comprising a memory storing computer readable instructions and a processor configured, by executing the computer readable instructions, to receive, via a network, TCP/IP packets each comprising a variable representing a length and a further variable having said length and representing at least a credential and an access request. Some of the further variables may have different lengths. The processor validates said credentials in response to received packets by accessing a local or remote database storing validities of said credentials, and then grants permission in response to validated credentials by generating control instructions and transmitting them via the network to a functional device that provides facility access.

In still a further aspect, the present invention is directed to an electronic bridge for transparently transmitting messages of different lengths from different functional devices to a network. The bridge comprises a memory storing a MAC address and electronic circuitry adapted to detect said messages and build TCP/IP packets, each packet comprising: the MAC address; an identification of a functional device; a variable representing length of a given message; and a variable representing the given message. The bridge then transmits the packets to the network. The packet may also include a message code for identifying the type of message.

BRIEF DESCRIPTION OF DRAWINGS

In drawings which illustrate embodiments of the invention, but which should not be construed as restricting the scope of the invention in any way.

DETAILED DESCRIPTION

Figure 1:
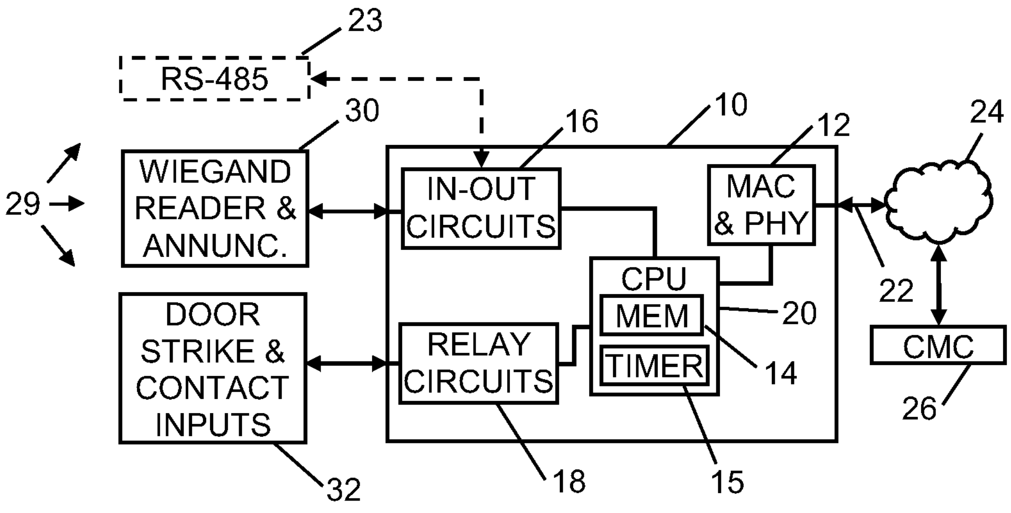
FIG. 1 is a block diagram of an exemplary embodiment of the bridge-based system for interfacing various functional devices for facility access with a network for control in accordance with the present invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Overview

The bridge of the present invention acts transparently to convey remote information, such as digital inputs or Wiegand reader inputs, to a CMC. One such CMC may be a MESH Server provided by Viscount Communication and Control Systems Inc. (the assignee of the present invention). The CMC controls all decisions regarding what is to be done with the conveyed digital inputs or Wiegand card inputs, and when such decisions are made, the CMC conveys the commands back to the bridge, via the Internet, for execution by functional devices, namely, output devices such as operating annunciators and access devices, such as door strikes. The term "functional devices" is meant in a generic sense to cover all devices serving or performing single or multiple functionalities (functions or actions), including but not limited to security functions.

Significantly, the bridge does not make any decisions about the data it is obtaining from its input sources. The bridge simply passes on the data to a CMC, which makes all the decisions then sends commands back to the bridge, telling the bridge what functional devices need to be activated. By such transparency and bridging operation, the bridge is not restricted from future expansion in terms of longer data streams and faster device protocols.

The Internet facilitates the conveyance of information to and from the bridge. The information conveyed, in both directions, is packaged in a format suitable for transfer via the Internet Protocol (IP) foundation using the Transmission Control Protocol (TCP) known as the TCP/IP protocol suite. The TCP/IP protocol suite has been chosen for the conveyance of the packaged data, in both directions, because of its reliability to deliver data packets to the intended destination. Furthermore, as an example, the TELNET protocol, which runs on top of IP, provides for terminal-like operation so that the CMC may be configured to communicate with serial RS-485 devices connected to the bridge. The use of the TELNET protocol is optional, as is the use of any other protocol which may run on top of IP.

Bridges with different numbers of channels may form an Internet-ready product family. For example, the bridge may be a single-channel unit, a dual-channel unit, a quad-channel unit, etc., each of which provides the appropriate hardware to connect various functional devices, such as digital contact inputs and Wiegand-compliant card readers at the remote end, via the Internet, to a customer's control and monitor computer (CMC) at the local end. In essence, the bridge may make a connection between dissimilar technologies such as the Internet at the one end and discrete functional devices at the other end. The bridge is not limited to only Wiegand-compliant card readers, as it may be adapted as required to any input or output source.

Exemplary Embodiments

Referring to FIG. 1, there is illustrated an exemplary embodiment of a bridge 10 in accordance with the present invention that is typically deployed at a remote location such as near an entrance to a building. The bridge 10 is connected by a communications link for example an Ethernet 22, via a network for example the Internet 24, to a CMC 26 which may be a server, for example. From the point of view of the system as a whole, the CMC 26 is considered to be local. Depending on the type of network 24, the bridge 10 may be located in the same building as the CMC 26, but remote from it, or it may be in a different building.

For connection to the network 24, the bridge 10 has Media Access Controller (MAC) and Physical Timing Generator (PHY) circuits 12. The MAC is an electronic Integrated Circuit with circuits to implement an interface between one or more programs running in the central processing unit (CPU) 20, and the buffering of data packets required for Internet operation. The PHY is an electronic Integrated Circuit with circuits to create the high-speed serial bit-timing for putting the packet data onto the Ethernet 22 for transport via the Internet 24. The PHY contains the circuits to connect to the Ethernet 22, so the PHY is the doorway for input and output. The CPU 20 may have internal memory (MEM) 14 for storing the programs and other information during operation. In the past, the CPU 20 and memory 14 would be separate Integrated Circuits, but today, they are typically combined into one larger CPU Integrated Circuit. Memory 14 may be of different types, such as volatile and non-volatile, and it may be distributed partially within the CPU 20 and partially external to it. Typically, a CPU, MAC, and PHY may be three separate Integrated Circuits. Alternately, the CPU 20 and MAC may be combined together in one Integrated Circuit, with an external PHY. Most recent improvements have all three of the CPU, MAC and PHY in the same Integrated Circuit. It does not matter which of these or even other alternatives is used as they all perform the same function. A MAC address may be stored in a non-volatile memory 14.

The bridge 10 includes various input-output circuits 16 that connect to various functional devices 29, namely input and/or output devices 30, such as Wiegand-compliant devices, which may be card readers and visible and/or audible annunciators. Input devices 30 may also include open/close sensors for detecting whether a door is open or closed. The bridge 10 also includes various relay, and input status circuits 18 that connect to various other functional devices 29, namely door strikes and digital contacts 32. There may be one or more of the functional devices 29 of the same or different kind connected to the bridge 10.

In the specific case of digital inputs, such as on/off status inputs, the bridge 10 is not limited to any pre-programmed interpretation as to the functionality of the digital inputs, such as "tamper detected", "request to exit", etc. but instead provides dynamic capability to adapt to future functionality because the digital input data is bridged transparently to the CMC 26 for analysis and processing.

Functional devices 29 such as annunciators and also door strikes may be classed as output devices, and any other output device that needs to be controlled may be connected. For example, an RS-485 serial device 23 may be connected to the in-out circuits 18 of the bridge 10 instead of or as well as input-output device 30. The RS-485 serial device may be virtually connected to the CMC 26 via the Internet 24 using the TELNET protocol, for example, so that the CMC 26 could talk to the RS-485 device in parallel with a card-access function of the bridge 10. The bridge 10 is not limited to any pre-programmed interpretation as to the functionality of the digital outputs, such as "open first door", "open second door", etc. but instead provides dynamic capability to adapt to future functionality because the digital output data is passed transparently from the CMC 26 to the output devices. The bridge 10 is not limited to any pre-programmed RS-485 protocol but instead provides a transparent virtual conduit to allow the CMC 26 to remotely communicate with a RS-485 serial device 23, if connected, via the Internet 24.

Various processes (one exemplary embodiment being shown in FIG. 3 and described hereinafter) may occur in the bridge 10 as the CPU 20 reads computer readable instructions that are stored in the memory 14 located within the CPU Integrated Circuit 20 or outside it in a separate Integrated Circuit. The instructions may be written in C-Language then compiled into machine-readable code, for example. One or more of the various processes may be started, for example, by an interrupt service request that is triggered by the hardware of circuits 16 and 18 in the bridge 10 detecting an input.

Specific hardware timer circuits 15 within the CPU 20 operate independently of the programmed-operation by the firmware within the CPU 20, and when said hardware timer circuits 15 expire, an interrupt service request may be generated to process the timer-expiry event.

The bridge 10 may be powered by a 12 Vdc power supply, but other power supplies may also be used, for example, Power over Ethernet (PoE).

The CMC 26 includes a processor and computer readable instructions stored in a digital memory for interpreting communications from the bridge 10 and preparing messages to be sent back to the bridge 10. Such instructions may be written in JAVA, for example, but the use of other programming languages is also possible.

The latency or delay time associated with conveying the data packets between the bridge 10 and the CMC 26 is acceptable due to the usually small amount of data that needs to be transmitted at a single time, and latency in the sub-second range is typical. However, as the amount of data increases, it is likely that faster protocols will be used, which the bridge 10 would be able to accommodate.

The CMC 26 may be configured to log all attempts to enter that are communicated to it via the bridge 10, or it may include or be connected to a logging server that performs this function.

For redundancy, communications to a second CMC, as a backup, may be provided by the bridge 10. A customer may develop his own CMC to communicate with the bridge 10, provided communications are compatible with the data package structure and formatting of the bridge 10. The customer is therefore not restricted to purchasing a CMC from the same vendor as for the bridge 10.

Figure 2:
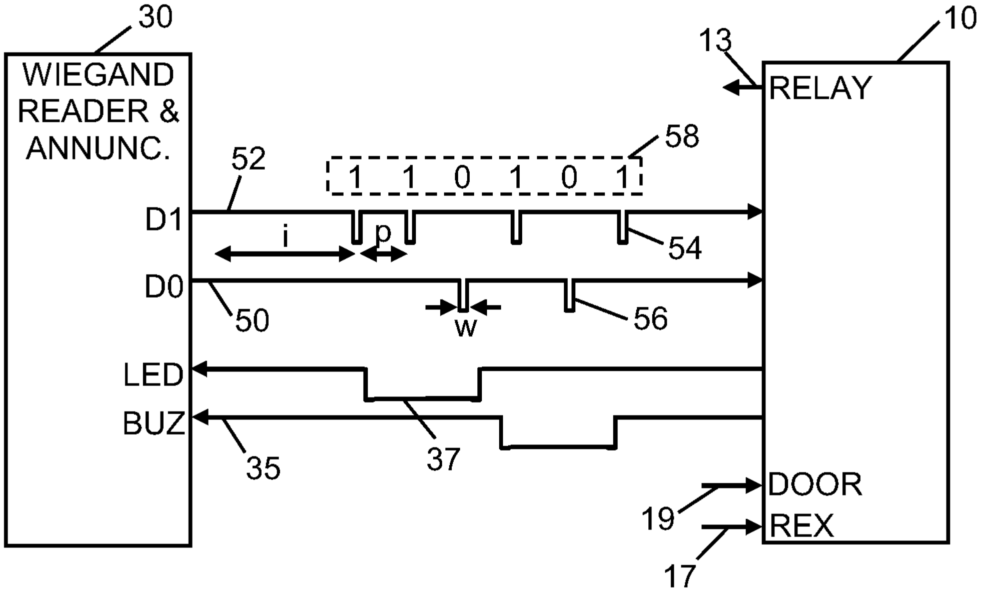
FIG. 2 is a schematic diagram of signals communicated between the bridge and a reader device.

Referring to FIG. 2, there is shown a schematic diagram of electrical pulses transmitted between the bridge 10 and Wiegand reader and annunciator device 30. The bridge 10 has a relay output for sending RELAY signals 13 from the circuits 18 to the door strike 32, which may be operated by a relay. The bridge 10 is also configured to receive a door input DOOR signal 19, which is a signal from another functional device 29 in the form of a sensor that indicates whether a door is open or closed. The bridge 10 is also configured to receive a request to exit (REX) signal 17, which may originate from another functional device 29 in the form of a push button located near the door through which exit is desired. The bridge 10 is configured to produce a BUZ signal 35 for controlling a buzzer on the Wiegand device 30. This signal may change state from high to low when the buzzer needs to be turned on, and vice versa for switching the buzzer off. The bridge 10 is also configured to produce a LED signal 37 for controlling an annunciating LED on the Wiegand device 30. This signal may change state from high to low when the LED needs to be turned from off to on, and vice versa for switching the LED off. There may be one or more LEDs that may be red, green or other colours. Each LED or colour of LED may indicate a different state, such as access permitted, access denied or a problem. The bridge 10 may also be configured to receive and produce other signals and/or signals with other formats depending on which input and output functional devices 29 are desired to be connected to the bridge 10, and which functional features are present in the Wiegand device 30. The approximate timing of the output signals that are produced may be determined by the CMC 26. Another functional output device 29 may be configured to sound a buzzer for a predetermined duration of time, so in this case, and other similar cases, the CMC will only send a trigger bit to such functional device 29.

The Wiegand device 30 uses two wires for data transmission, usually called D1 (or DATA1) and D0 (or DATA0). There is usually a common ground, not shown, that is connected between the Wiegand device 30 and the bridge 10. When no data is being sent both D0 and D1 are at a high voltage 50, 52 which is nominally 5V. When a "1" is sent, a low pulse 54 is created on the D1 wire while the D0 wire stays high. When a "0" is sent, a low pulse 56 is created on the D0 wire while the D1 wire stays high. Pulses have a width w, which is typically between 20 μs and 100 μs, and are separated by a time period p, which ranges from about 200 μs to 2 ms. The time duration marked "i" is an idle time period during which no further pulses in a given message are detected. A train of pulses outputted by the Wiegand device 30 represents a series of bits 58 which may correspond to data held in a personal card or fob that is read by the Wiegand device 30.

The format of the pulses is known as the Wiegand Protocol. Presently there are two common versions of the Wiegand Protocol, one with a 26-bit data stream and the other with a 36-bit data stream. Future protocols may have fewer or more bits, and the width w and/or intervening period p of the pulses may be modified by future enhancements to the Wiegand Protocol. Different voltages may be used for the signal levels, for example, 4V or 5.5V may be used for D1 and D0 when no data is being transmitted, and the low level for when a data pulse is being transmitted may be from 0V up to 1V. Still, other voltages may be used. For the auxiliary functional devices 29, such as the buzzer, LED and door strikes, the signal level may also by nominally 5V, but with a greater tolerance. The Wiegand device 30 may be powered by the bridge 10, for example with 12 Vdc, but other voltages are also possible, and the Wiegand device 30 may alternately have its own power source.

The bridge 10 is configured to detect signals which comply with the current Wiegand Protocol, but it is also capable of detecting signals that go beyond the bounds of the existing protocol. For example, the bridge 10 may detect pulses that are more frequent and/or that are shorter than in the existing protocol, and may detect pulse streams that are any length up to 1024 bits long. While 1024 bits have been selected as being adequate for many years, depending on the design of the bridge 10, other maximums may be chosen. The bridge 10 may detect as is, or be configured to detect, signals from other protocols that create a series of pulses, on one, two or more wires, and even signals that have more than two levels on a single wire.

Figure 3:
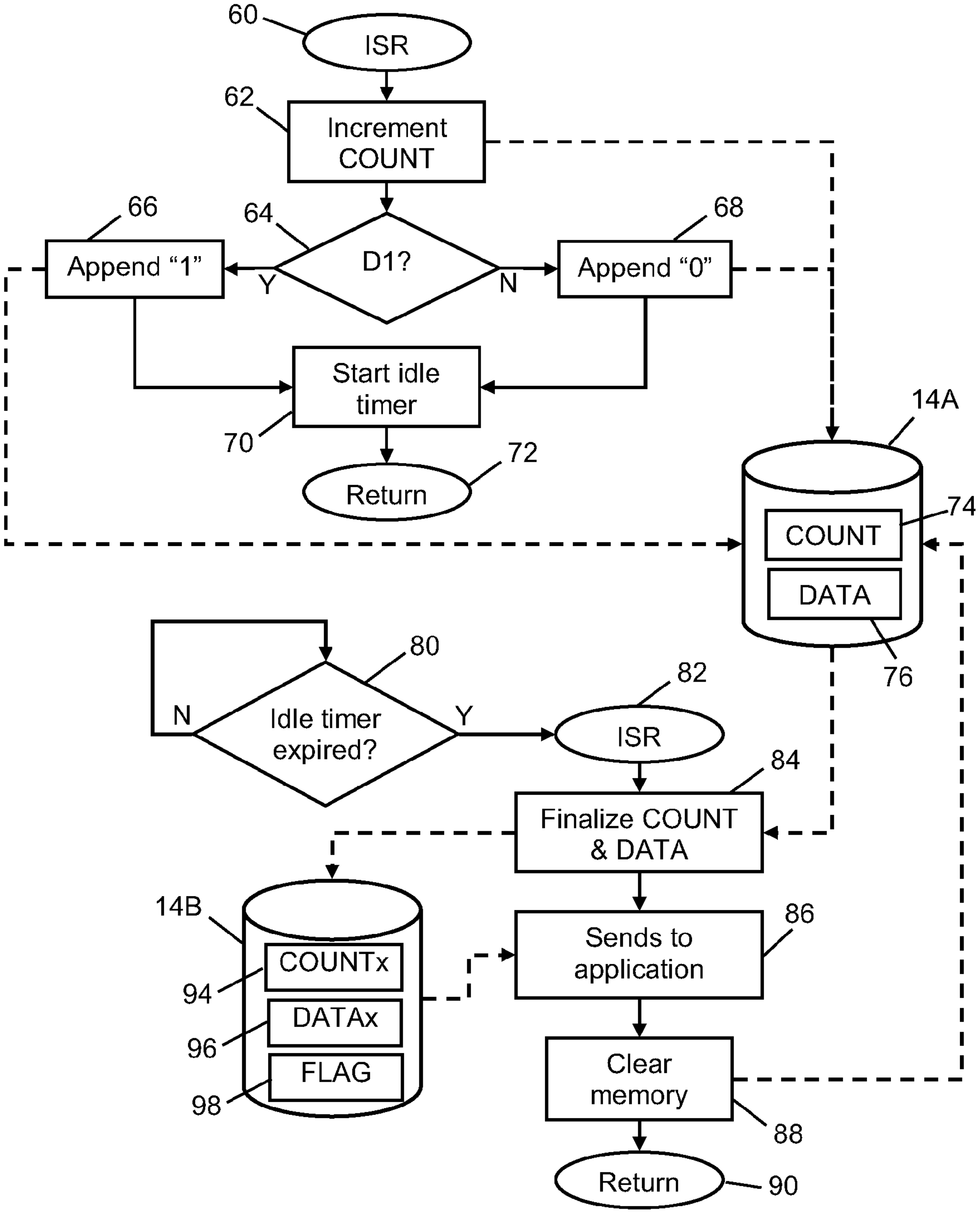
FIG. 3 is a flowchart of some of the steps of an interfacing method performed by the bridge in accordance with the present invention for building detected input signals into a store of data.

Referring to FIG. 3, there is shown a flowchart of an exemplary embodiment of some of the steps in the interfacing method in accordance with the present invention that occurs in, or mostly in, the CPU 20 of the bridge 10. These steps of the method create temporary variables in memory corresponding to pulses transmitted from a Wiegand reader device 30 and detected by the bridge 10.

When an input signal is detected by an input circuit 16 in the bridge 10, the input circuit, in step 60, sends an interrupt service request (ISR) to the CPU 20. Provided there are no other processes running that have been triggered by prior interrupts, in step 62 the CPU 20 then increments a variable called COUNT designated 74 in memory 14A, which may be a portion of memory 14. If this be the first pulse in a train of pulses, then COUNT 74 may be incremented from 0 to 1. In step 64 the CPU then determines whether the pulse is a 1 or not. If the pulse has been received on the D1 line, then it is a 1 and a bit of value 1 is appended in step 66 to a variable called DATA designated 76 in memory 14A. If this be the first bit of the train of pulses, then at this point the variable DATA will consist of a single bit of value 1. If, at the decision point in step 64, the pulse has not been received on the D1 line, then it must have been received on the D0 line, and therefore corresponds to a bit of value 0. In this case, a 0 is appended to the variable DATA 76 in memory 14A. As an alternative to ISR 60 processing both D1 and D0 interrupts within one Interrupt Service Routine, the bridge 10 may be programmed to process D1 and D0 interrupts independently, thereby not requiring the decision 64 to determine whether to append a 1 or a 0 to the variable DATA 76 in memory 14A.

After the appropriate bit has been appended to the variable DATA 76, in step 70 the CPU 20 starts the idle timer of timer circuits 15. The idle time may be set to twice the maximum interval p between successive data pulses, or it may be set to some other desired value. The idle timer may count upwards or downwards. The principle of the idle timer is to measure a length of time long enough to make a determination that the last of a train of pulses has been received at the bridge 10. By using the idle timer to detect that the last pulse of a train has been received, pulse trains of many different lengths may be detected without having to configure the bridge 10 to always accept the same number of pulses. As a result, Wiegand or other protocols that are longer than current ones may be detected without any hardware, firmware or software change to the bridge 10. For example, it is conceivable that 75-bit, 128-bit, 200-bit, 256-bit or other bit-number Wiegand protocols may be developed. After the idle timer is set, in step 72 the process returns control of the CPU 20 to what it was doing before the ISR in step 60 or to another process for which an interrupt has been requested and queued.

In step 80 the bridge 10 monitors whether or not the idle timer has expired. Specific hardware timer circuits 15 within the CPU 20 operate independently of the programmed-operation by the firmware within the CPU 20, and when the hardware timer circuits 15 expire, in step 82 an interrupt (ISR) is generated to process the timer-expiry event. If the hardware timer circuits 15 have not expired, no action is taken. In particular, if the hardware timer circuits 15 have not expired by the time a subsequent pulse is received by the bridge 10, then another interrupt service request is created in step 60. The process moves through the upper part of the flowchart, incrementing the variable COUNT 74 by 1, appending either a 0 or a 1 to the variable DATA 74 and restarting the idle timer in step 70. This process is repeated as many times as data signals are received provided that the idle timer does not expire.

If in step 80 the idle timer expires, in step 82 another ISR is sent to the CPU 20. The fact that the idle timer has expired indicates that the entire message, or train of pulses, has been received. The temporary variables COUNT 74 and DATA 76 are then finalized in step 84. The values of COUNT 74 and DATA 76 are copied to final variables COUNTx designated 94 and DATAx designated 96 in memory 14B and a message (FLAG) flag designated 98 is set to indicate that these variables are ready for sending to the CMC 26 in the form of a message. The variables may be stored in the memory 14B, which may be part of memory 14. The CPU 20 then in step 86 sends the final variables COUNTx 94 and DATAx 96 to an application running in the CPU 20 for further processing and transmission to the CMC 26. The temporary memory 14A is then cleared in step 88, such that COUNT 74 is set to zero and DATA 76 is null. In step 90 the process then returns allowing the CPU 20 to continue what is was doing before the ISR was received in step 82, or to start another process for which an interrupt is queued.

Figure 4:
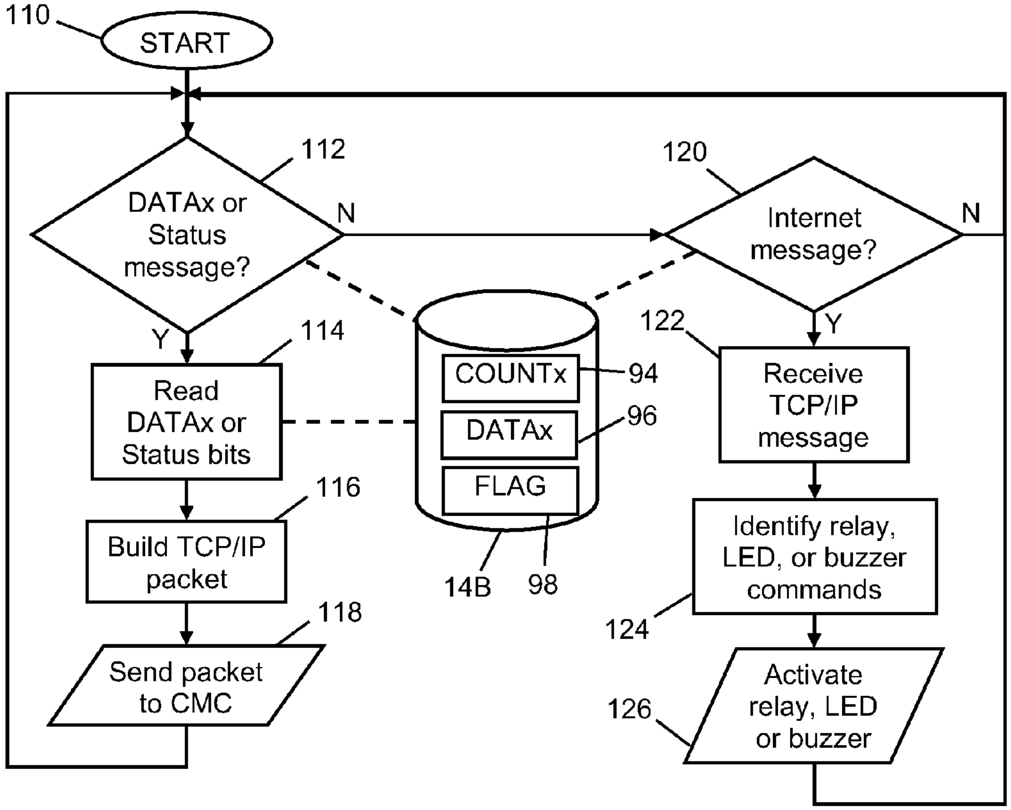
FIG. 4 is a flowchart of other of the steps of the interfacing method performed by the bridge in accordance with the present invention for transmitting stored data to a control and monitor computer (CMC).

Referring to FIG. 4, there is shown a flowchart of an exemplary embodiment of other of the steps of the interfacing method in accordance with the present invention, constituting an expansion of step 86 in FIG. 3, in which the final variables COUNTx and DATAx are subjected to processing by an application running in the CPU 20 and then sent to the CMC 26. After the processing has started in step 110, the CPU is continually and frequently looking at message (FLAG) flag 98. If the flag be set, in step 112 the CPU 20 determines by looking at the flag 98 whether the message received is one that contains Wiegand data originating from the D1 and D0 lines (DATAx), or whether it is a different type of message, such as a DOOR signal 19 from a door sensor or a REX signal 17 (Status). The flag 98 may comprise multiple flags, of which one may indicate that a Wiegand message is ready and others that input status bits generated by the in-out circuits 18 have changed, for example from old values to new values depending on signals detected from the functional devices 30.

If, in step 112, the CPU 20 determines that the message is a D1/D0 type message, then the bits of the message, i.e. the bits of COUNTx 94 and DATAx 96, are read in step 114 from the memory 14B. The bits that have been read are then built in step 116 into a TCP/IP packet and sent in step 118 to the CMC 26.

If, in step 112, the CPU 20 determines that the message is a Status type message, then the bits of the message, i.e. the Status bits, are read in step 114 from the input circuits 16. The bits that have been read are then built in step 116 into a TCP/IP packet and sent in step 118 to the CMC 26.

If, in step 112, the CPU 20 determines that the message is neither a D1/D0 nor Status type message, then the CPU 20 determines in step 120 whether the MAC 12 is indicating the presence of an Internet message (from the CMC 26) that needs to be processed. If it be another type of TCP/IP message, then the message is received in step 122. The CPU then identifies in step 124, for example, commands for the buzzer, a relay, or an LED, the corresponding one of which is then activated in step 126 by sending a corresponding signal to the relevant functional output device 29.

If in step 120 there be no message, or after a message has been sent in step 118 to the CMC or sent in step 126 to activate an appropriate one functional output device 29, the process returns to step 112.

Figure 5:
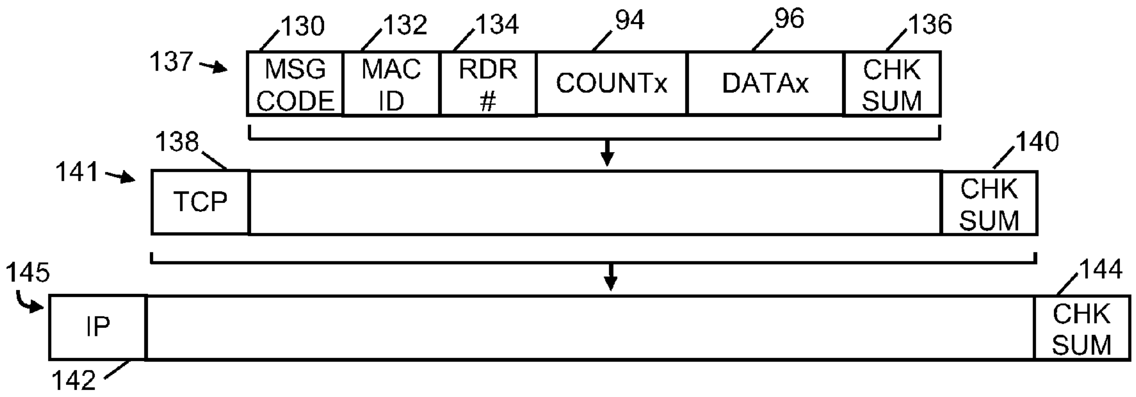
FIG. 5 shows data embedded in various packets used for transmission.

As shown in FIG. 5, the COUNTx 94 and DATAx 96 bits are built into packets, according to the well known protocol stack for TCP/IP transmission. The packet created by the application running in the CPU has: a message code 130 at the start to identify the type of message encoded, be it Wiegand, Status, Command, and the like, followed by the MAC address 132 or other identification of the particular bridge 10; followed by the reader number 134 for embodiments where more than one reader device 30 may be connected to the bridge 10; followed by the variable COUNTx 94 indicating the number of data bits; followed by the bits of data themselves DATAx 96; followed by a checksum 136.

Some examples of possible message codes 130 for communication packets sent from the bridge 10 to the CMC 26 are:

Msg Code=128, means Card Reader Tag DATAx

Msg Code=129, means Contact Input Point Status

Msg Code=130, means Bridge Information

Msg Code=131, means Acknowledge Receipt of previous command

Some examples of possible message codes 130 for communication packets sent from the CMC 26 to the bridge 10 are:

Msg Code=0, means Activate Relay Command

Msg Code=1, means Get Contact Input Point Status

Msg Code=2, means Get Bridge Information

Msg Code=3, means Acknowledge Receipt of previous reply

Msg Code=4, means Set Power-On State of Output Points

The numbers for the message codes 130 are chosen to be unique. Each message code number ensures that both the CMC 26 and the bridge 10 know the content of the packet and process it correctly.

This application packet 137 is then embedded in a transmission control protocol packet 141, which has a TCP header 138 and a TCP checksum 140 added therein. The TCP packet 141 is further embedded in an IP packet 145, which has an IP header 142 and an IP checksum 144 added therein. The data is now ready for transmission to the CMC 26. For presently conceivable lengths of DATAx 96, the message will fit into a single IP packet, although in the future, if very long messages are desired, then two or more packets may be needed.

Conversely, when a packet is received by the bridge 10, it is stripped of its various headers and checksums as it passes through the layers of the TCP/IP protocol stack, to ultimately reveal data bits that may be used for identifying and controlling functional output devices 29, such as door strikes, buzzers, and LEDs. The format of the data may be, for example, similar to that used for Wiegand packet 137 with the COUNTx and DATAx replaced by control bits for the various door strikes, buzzers, and LEDs.

Figure 6:
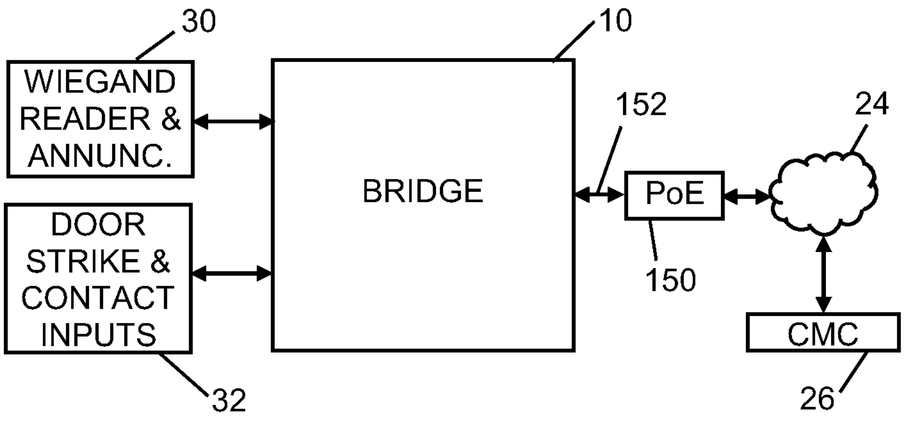
FIG. 6 is a block diagram of the bridge connected to a power over ethernet (PoE) switch.

There are many configurations in which the bridge 10 may be configured or connected, and the following text describes just a few or them as shown in FIGS. 6-9. Referring first to FIG. 6, the bridge 10 may be connected to a powered Ethernet cable 152 using Power-over-Ethernet (herein 'PoE') technology. The PoE cable 152 connected to a PoE switch 150, which is an off-the-shelf device capable of providing both power and Ethernet to the bridge 10. The PoE switch is also connected to the Internet 24 as it needs to convey data packets received from PoE devices, such as bridge 10, over the Internet 24 to the appropriate destination.

In the case of a bridge 10 that communicates over a wireless communications channel 22 (FIG. 1) to the Internet, then the wireless bridge would have no PoE cable and would be powered from a local dc power supply at the bridge location. Wireless technology may be used to communicate with the Internet, via the IEEE 802.11 protocol using the most secure and latest implementation thereof. The key functionality of wireless and wired bridges 10 are the same, the difference being only the method of connecting to the Internet.

Figure 7:
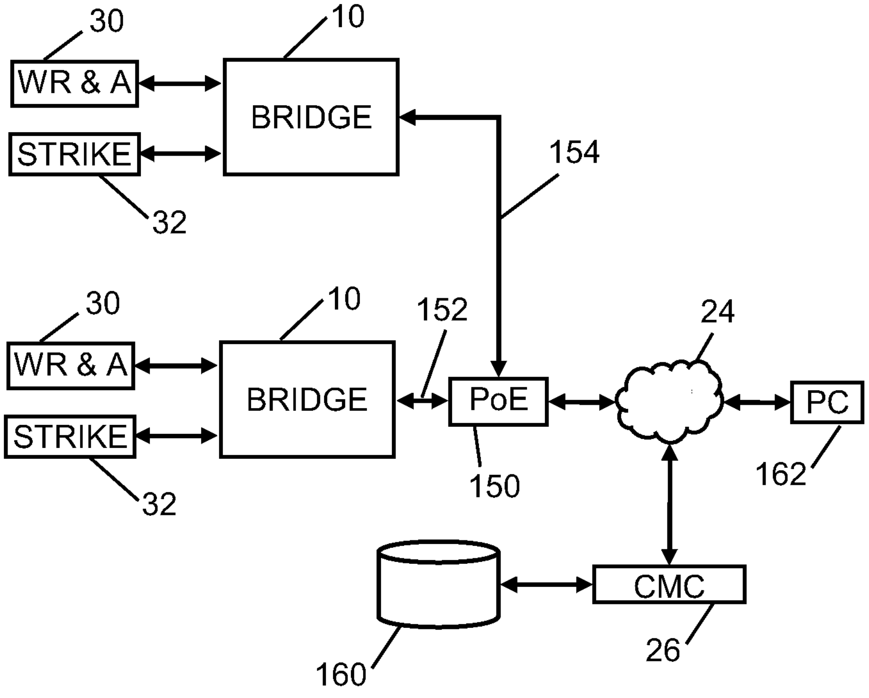
FIG. 7 shows multiple bridges connected to a power over ethernet switch.

Referring to FIG. 7, if a second bridge 10 be required at the same remote location, it may be powered from its own PoE cable 154 from the PoE switch 150. Also in FIG. 7, a central database 160 is shown to which the CMC 26 is connected. The database 160 contains details of users, user IDs, permissions, policies etc., which permits the CMC 26 to determine whether or not to allow access to a particular person via a particular door or portal at a particular time and/or day of the week. The use of such a central database 26 eliminates the need to store a different set of user IDs and permissions at each individual bridge 10. Other computers, such as servers, general purpose computers and/or PCs 162 may be connected to the CMC 26 via the Internet or local Ethernet 24. Access to the security program and/or database 160 may be possible via such other computers 162.

Figure 8:
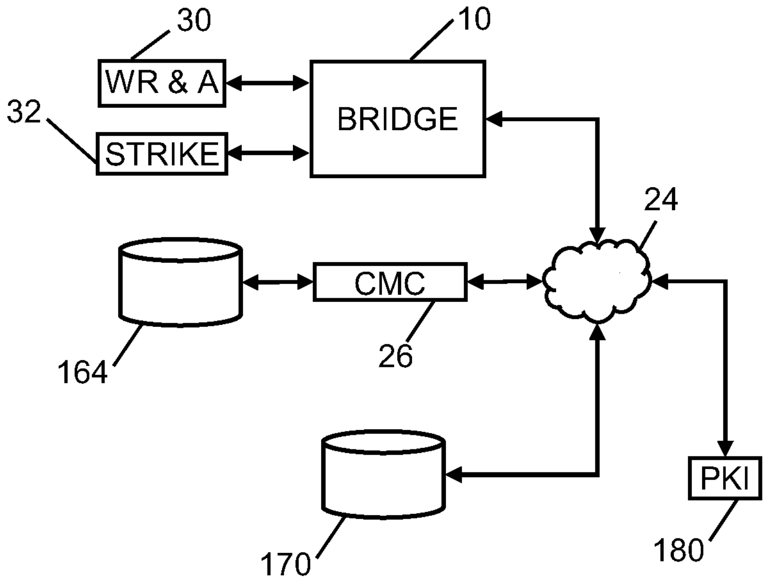
FIG. 8 shows a bridge connected via the Internet to a Public Key Infrastructure server.

Referring to FIG. 8, there is shown another way of connecting the bridge 10 into a security system. In this configuration, the CMC 26 is connected to a local cache 164 of data and the main, central database 170 is connected to the CMC 26 via the Internet 24. In this case the central database 170 may be located remotely from the premises which are to be protected. It is possible that the database 170 be located at multiple remote sites, with multiple mirrors and/or backups. The database 170 may be located in one of Microsoft's Active Directories, for example.

Also shown in FIG. 8 is a connection from the CMC 26 via the Internet 24 to a Public Key Infrastructure (PKI) server 180. The function of the PKI server is to verify whether a particular ID sensed at an input device 30 is valid or not. An extra level of security is added by separating the ID validity check from the policies and permissions check at the database cache 164 or the central database 170.

Every so often, details of personal ID cards, which have become invalid and are stored in the PKI server 180, may be transferred to the central database 170. This may allow the ID validity check to be performed at the central database 170 on data that is managed by the PKI server 180. The PKI server may store both valid IDs and invalid IDs but it may be more efficient to only store or only check for invalid IDs.

An advantage of using a central database 170 is that multiple CMCs 26 may be connected via the Internet 24 to it. Large organizations may have multiple sites, or a presence in multiple locations across the country or around the globe. Each site or group of sites or city may have its own CMC 26, and it would be more useful to have one common user ID and permissions database than to have to maintain several of them.

Figure 9:
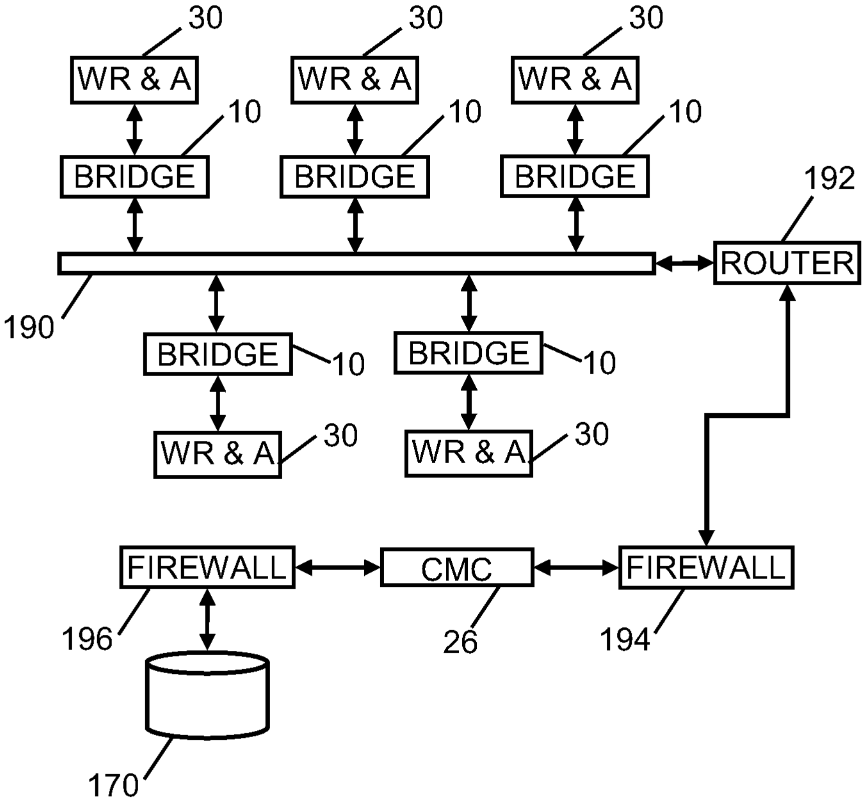
FIG. 9 shows multiple bridges connected via a router to a CMC.

Referring to FIG. 9, there is shown a diagram of multiple bridges 10 connected to an Ethernet cable 190. The bridges 10 are connected via a router 192, through a firewall 194 to a CMC 26. The CMC 26 is connected in turn via another firewall 196 to the central database 170.

The steps of the process described herein may be performed in a different order to that shown, they may be performed differently, or some may be omitted while still achieving the same objective. Variables used may be given different names and packets may be assembled in a different order. Voltages and/or logic levels may be changed.

As well as use with security oriented functional devices, the bridge 10 may be used with other functional devices, namely building management components and devices, such as lights, daylight sensors, light level sensors, temperature sensors, heating appliances, air conditioning systems, humidity detectors, automated blind controls, occupancy sensors, smoke sensors etc.

As will be apparent to those skilled in the art in the light of the foregoing disclosure, many further alterations and modifications are possible in the practice of this invention without departing from the scope thereof. Accordingly, the scope of the invention is to be construed in accordance with the substance defined by the following claims:

The invention claimed is:

1. A system for interfacing facility access with control, said system comprising:

a plurality of functional devices adapted to receive control instructions and generate trains of digital pulses wherein said trains of digital pulses relate to various facility access functionalities of said devices and at least some of said trains of pulses have different format protocols in terms of one or more of number of pulses, pulse width and time period between pulses;

a network including at least one control unit adapted to generate said control instructions; and at least one electronic bridge interfacing said devices and said network, said bridge having input/output circuits adapted to receive said control instructions, pass said control instructions to said devices, and detect said trains of digital pulses from said devices, and a central processing unit (CPU) configured to receive said trains of digital pulses from said input/output circuits, start processing said trains of digital pulses into strings of data signals without first determining said different format protocols of said trains of digital pulses, build packets including said strings of data signals, and send said packets to said control unit via said network.

2. The system of claim 1 wherein said CPU processes said trains of digital pulses into strings of data signals by:

setting an idle timer to mark expiry of a time duration, greater than said time period between pulses, during which no further pulses in a given train are detected by said input/output circuits;

serially generating temporary variables of pulse count and a data string by adding counts and appending data of detected pulses in the given train to said temporary variables; and sensing the expiry of said time duration during which no further pulses in the given train are detected by said input/output circuits.

3. The system of claim 2 wherein said setting said idle timer is in response to said input/output circuits detecting a pulse in a given train of pulses.

4. The system of claim 2 wherein said CPU readies said strings of data signals, for building into packets, by:

terminating said generation of said temporary variables in response to said sensing said expiry of said time duration;

storing said temporary variables as final variables in response to said termination of said generation of temporary variables; and setting a flag to indicate that said final variables are ready for building into packets.

5. The system of claim 4 wherein said network is an Ethernet or the Internet and said building of said packets includes building said fixed variables into a TCP/IP packet for transmission to said control unit via the network.

6. The system of claim 1 wherein said control unit validates credentials of said functional devices and said control instructions generated by said control unit include granting of permission to gain facility access.

7. The system of claim 1 wherein said network also includes the Internet and a communications link coupling said control unit to said bridge.

8. The system of claim 7 wherein said network further includes a Public Key Infrastructure (PKI) coupled to the Internet, said PKI storing validities of credentials and wherein said control unit accesses said PKI to validate credentials and generates said control instructions depending on validity of credentials.

9. The system of claim 7 wherein said network further includes database coupled to one or both the Internet and said control unit, said database storing one or more of credentials, validity of credentials, permissions, entry requests and times of entry requests.

10. The system of claim 7 wherein said communication link is wireless.

11. The system of claim 7 wherein said communications link is Power-over-Ethernet technology.

12. A method for interfacing facility access with control, said method comprising:

generating trains of digital pulses by various facility access functional devices wherein at least some of said trains of pulses have different format protocols in terms of one or more of number of pulses, pulse width and time period between pulses;

receiving control instructions from a control unit via a network;

passing said control instructions to said various facility access functional devices to control the same;

detecting said trains of digital pulses;

starting to process said trains of digital pulses into strings of data signals without first determining said different format protocols of said trains of digital pulses;

building packets that include said strings of data signals; and sending said packets to said control unit via said network.

13. The method of claim 12 wherein said processing said trains of digital pulses into strings of data signals includes:

setting an idle timer to mark expiry of a time duration, greater than said time period between pulses, during which no further pulses in a given train are detected;

serially generating temporary variables of pulse count and a data string by adding counts and appending data of detected pulses in the given train to said temporary variables; and sensing the expiry of said time duration during which no further pulses in the given train are detected.

14. The method of claim 13 wherein said setting said idle timer is in response to detecting a pulse in a given train of pulses.

15. The method of claim 12 wherein said building said strings of data signals into packets is in response to:

terminating said generation of said temporary variables in response to said sensing said expiry of said time duration;

storing said temporary variables as final variables in response to said termination of said generation of temporary variables; and setting a flag to indicate that said final variables are ready for building into packets.

16. An electronic bridge for interfacing facility access with control, said bridge comprising:

input/output circuits adapted to output control instructions to various functional devices relating to various facility access functionalities, and detect trains of digital pulses from the various functional devices; and a central processing unit (CPU) configured to receive control instructions from a control unit via a network, pass said control instructions to said input/output circuits for output to the functional devices, receive said trains of digital pulses from said input/output circuits wherein at least some of said trains of pulses have different format protocols in terms of one or more of number of pulses, pulse width and time period between pulses, start processing said trains of digital pulses into strings of data signals without first determining said different format protocols of said trains of digital pulses, build packets including said strings of data signals, and send said packets to the control unit via the network.

17. The bridge of claim 16 wherein said CPU processes said trains of digital pulses into strings of data signals by:

setting an idle timer to mark the expiry of a time duration, greater than said time period between pulses, during which no further pulses in a given train are detected by said input/output circuits;

serially generating temporary variables of pulse count and a data string by adding counts and appending data of detected pulses in the given train to said temporary variables; and sensing the expiry of said time duration during which no further pulses in the given train are detected by said input/output circuits.

18. The bridge of claim 17 wherein said setting of said idle timer is in response to said input/output circuits detecting a pulse in a given train of pulses.

19. The bridge of claim 17 wherein said CPU readies said strings of data signals, for building into packets, by:

terminating said generation of said temporary variables in response to said sensing said expiry of said time duration;

storing said temporary variables as final variables in response to said termination of said generation of temporary variables; and setting a flag to indicate that said final variables are ready for building into packets.

20. The bridge of claim 19 wherein said building into packets includes building said final variables into a TCP/IP packet for transmission to the control unit via an Ethernet or the Internet.

21. A control unit for controlling facility access via a network and an electronic bridge, said control unit comprising:

a memory storing computer readable instructions; and a processor configured, by executing the computer readable instructions, to:

receive, via a network, TCP/IP packets each comprising:

a variable representing a length; and a further variable having said length and representing at least a credential and an access request;

wherein at least some of the further variables have different lengths;

validate said credentials in response to received packets by accessing a local or remote database storing validities of said credentials; and grant permission in response to validated credentials by:

generating control instructions; and transmitting the control signals via the network and an electronic bridge to a functional device that provides facility access, said bridge comprising:

input/output circuits adapted to output said control instructions to said functional device, and detect trains of digital pulses from said or other functional devices; and a central processing unit (CPU) configured to receive said control instructions from the control unit via the network, pass said control instructions to said input/output circuits for output to said functional device, receive said trains of digital pulses from said input/output circuits wherein at least some of said trains of pulses have different format protocols in terms of one or more of number of pulses, pulse width and time period between pulses, start processing said trains of digital pulses into strings of data signals without first determining said different format protocols of said trains of digital pulses, build packets including said strings of data signals, and send said packets to the control unit via the network.

22. An electronic bridge for transparently transmitting messages of different lengths from different functional devices to a network, the bridge comprising:

a memory storing a MAC address; and electronic circuitry adapted to:

detect said messages, each message comprising a train of digital pulses from a functional device, wherein at least some of said trains of pulses have different format protocols in terms of one or more of number of pulses, pulse width and time period between pulses;

start processing said trains of digital pulses into strings of data signal without first determining said different format protocols of said trains of digital pulses;

build TCP/IP packets from said strings of data, each packet comprising:

the MAC address;

an identification of one of said functional devices;

a variable representing length of a given message; and a variable representing the given message; and transmit the packets to the network.

23. An electronic bridge according to claim 22 wherein each packet further comprises a message code that identifies a type of message.

* * * * *